July 10, 1951  T. BROWN  2,559,935
ADJUSTABLE WHEEL BASE TRACTOR
Filed Nov. 23, 1949
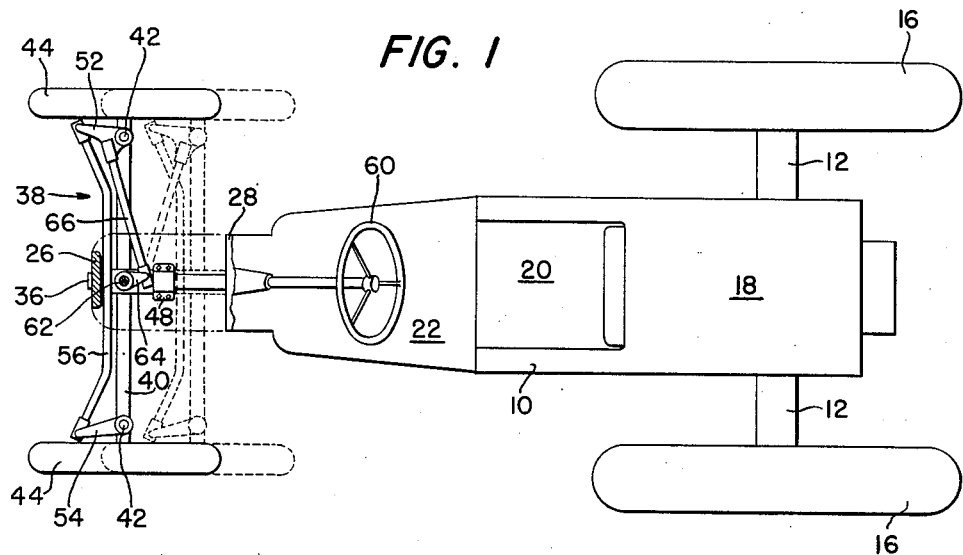
INVENTOR.
THEOPHILUS BROWN
ATTORNEYS Patented July 10, 1951

2,559,935

UNITED STATES PATENT OFFICE 2,559,935

ADJUSTABLE WHEEL BASE TRACTOR

Theophilus Brown, Moline, Ill., assignor to Deere & Company, Moline, Ill., a corporation of Illinois Application November 23, 1949, Serial No. 129,069

7 Claims. (Cl. 280—87)

This invention relates to a vehicle and more particularly to an agricultural tractor provided with means whereby the wheel base or longitudinal spacing between the front and rear wheels may be varied.

The importance of the invention lies in the value in an agricultural tractor of an adjustable wheel base so that the tractor may be easily accommodated to use in different operations. For example, in the use of the tractor with a plow, it is desirable that the wheel base be relatively short, whereas in the use of the tractor with a cultivator carried at the forward end of the tractor, it is desired that the wheel base be increased. In the latter instance, the increased wheel base gives increased space for the mounting of the cultivator or other tools similarly mounted on or carried by the tractor. In addition, the increased flexibility of the tractor made possible by the variable wheel base enables the wheel base to be shortened when the use of the tractor under certain conditions requires greater maneuverability than is possible in a tractor with a fixed, relatively long wheel base.

It is an important object of the invention to provide a tractor front end construction including a front axle which may be fixed in either a front or a rear position and to provide simple and easily manipulatable means for obtaining either position. Another object of the invention is the provision of improved steering means whereby change in position of the front axle in accordance with variations in wheel base will require no modification of the steering linkage. Specifically, it is an important feature of the invention to provide a front end construction for a tractor which is characterized in that it has the shape of an arch as viewed in side elevation, and the main components of the axle mounting and steering means are disposed within this arch.

The foregoing and other important objects and desirable features inherent in and encompassed by the invention will become apparent as a preferred embodiment of the invention is fully disclosed in the following detailed description and accompanying sheet of drawings, in which Figure 1 is a plan view of the tractor, with forward portions thereof broken away and shown in section, illustrating in full lines the longer wheel base of the tractor and in dotted lines the rear position of the front axle and wheels to shorten the wheel base of the tractor;

Figure 2 is a side elevational view of the tractor shown in Figure 1, a forward portion of the front axle structure being shown in section to reveal the details in the mounting thereof; and Figure 3 is an enlarged fragmentary sectional view taken on the line 3—3 of Figure 2 and illustrating the stop means for fixing the front axle in either of its positions.

The invention is applicable in its broader aspects to vehicles in general. Hence, the particular illustration and description of the invention in connection with the tractor should be taken as merely representative and not limiting.

The tractor illustrated comprises a longitudinal relatively narrow body 10 carried on a rear axle structure including oppositely, laterally extending axle housings 12, each of which journals a driving axle 14 (Figure 2) on which is carried a traction wheel 16. The rear part of the body is provided with an internal combustion engine (not shown) enclosed within a sheet metal hood 18 at the forward part of which is an operator's station 20. The portion of the body ahead of the operator's station 20 is provided as a platform 22. As stated above, the particular tractor is merely representative of many forms that such tractor could assume.

The front end of the body includes a forward extension or part 24 of the body. This part may be in the form of a casting or other suitable construction rigidly secured to or formed integral with the intermediate portion of the body 10. As best seen in Figure 2, the part 24 is in the form of an arch as viewed from the side and has a front supporting element 26 and a rear supporting element 28, these elements being in longitudinal alinement between an upper portion 30 of the arch. The element 28 is recessed or socketed at 32 to carry the rear end of a longitudinal pivot or mounting member 36. Means such as a cap screw 34 may be provided in conjunction with the element 28 to secure the pivot member rigidly in place. The forward or front supporting element 26 is apertured in alinement with the recess or socket 32 so that it may carry the front end of the pivot member 36. In this manner, the member 36 is fixedly positioned with respect to the elements 26 and 28 and is located within the arch formed by these elements and the portion 30.

The forward end of the tractor body is carried on a front axle structure designated generally by the numeral 38. This axle structure comprises a transverse axle member 40 provided at opposite ends with vertical spindles 42 which are respectively provided with steerable wheels 44. The axle member 40 is provided intermediate its ends with a journal 46 which is provided with a longitudinal bore through which passes the longitudinal pivot member 36. Thus, the axle structure 38 is mounted on the pivot member 36 for pivotal movement about the longitudinal axis of the member 36. Hence, the axle structure 38 may oscillate about the longitudinal axis as the front wheels encounter uneven terrain.

In addition to the pivotal movement just mentioned, the bearing provided at 36—46 accommodates shifting of the axle structure lengthwise of the pivot member 36. It will be noted that the journal 46 is relatively long to provide maximum fore and aft stability. The shiftability of the axle structure along the member 36 enables the axle structure to have a forward position (shown in full lines in the drawings) or a rearward position (shown in dotted lines in the drawings).

Either position of the front axle structure 38 may be selectively fixed by means including a separable collar 48. This collar is best shown in Figure 3 as comprising a pair of complementary halves removably or separably secured together by a plurality of bolts 50. This collar is formed for separability so that it may be readily removed to allow the axle structure to be shifted between its front and rear positions, after which it may be replaced. The arrangement is such that the collar occupies the same position in either position of the axle structure, in one case being behind the journal 46 and in the other case being ahead of the journal.

The tractor is equipped with steering mechanism, part of which is included in the axle structure 38. This part includes a steering arm 52 on the spindle 42 of the right-hand wheel 44 and a steering arm 54 on the spindle 42 of the left-hand wheel 44. The steering arms 52 and 54 are cross-connected by a transverse tie rod 56 which passes through the arch provided by the elements 26 and 28 and the portion 30 and is located above the axle member 40 and journal 46 and below the portion 30. The body part 34 carries at the top portion thereof an auxiliary housing 58 within which is located appropriate gearing (not shown) controlled by a steering wheel 60 accessible to an operator on the operator's station 20 or platform 22. The steering mechanism further includes a steering shaft 62 which is movable angularly about a vertical axis. This shaft projects downwardly to a level below the upper portion 30 of the arch structure and has fixed thereto a rearwardly extending control arm 64. This arm is disposed above the level of the tie rod 56 and the projected end thereof is substantially centrally between the wheels 44 and intermediate the mounting elements 26 and 28. A transversely disposed drag link 66 is pivotally connected at one end to the projected end of the control arm 64 and is pivotally connected at its other end to the right-hand steering arm 52. The arrangement is such that the connection of the drag link 66 to the steering arm 52 is, in either position of the axle structure 38, on an arc having as its center the pivotal connection between the drag link 66 and the control arm 54. Thus, regardless of the position of the front axle structure 38, no adjustments or modifications are required in the steering mechanism.

The adjustment of the front axle structure 38 from its forward to its rearward position may be accomplished by power after the separable collar 48 has been removed. That is, the front wheels may be blocked against forward movement and the tractor moved forwardly to effect forward movement of the body relative to the front axle. The rearward position of the front axle thus obtained may be fixed, of course, by replacing the collar 48. Likewise, the axle may be shifted from rear to front by removing the collar 48, blocking the front wheels against rearward movement and then driving the tractor rearwardly, subsequently fixing the forward position of the front axle by means of the collar 48.

Since the drag link is above and clears the tie rod, movement of the axle structure between its positions does not cause any conflict between the steering mechanism components.

Various features of the invention not specifically enumerated herein will undoubtedly occur to those versed in the art on the basis of the disclosure of the preferred form of the invention made herein, as likewise will numerous modifications and alterations, all of which may be achieved without departing from the spirit and scope of the invention as defined in the appended claims.

What is claimed is:

1. In a tractor having a longitudinal body carried at its rear end on a transverse rear axle structure: a front end construction, comprising a body part at the front end of the tractor body including longitudinally spaced-apart supporting elements and an upper portion above and interconnecting said elements so that said body part is in the form of an arch as viewed from either side of the tractor; a longitudinal pivot member within said arch and carried at its front and rear ends respectively by the supporting elements and spaced below said upper portion; a transverse front axle within said arch and having a journal pivotable on and shiftable lengthwise of the pivot member between said supporting elements to occupy either a front or a rear position so that the longitudinal distance between the front axle and the rear axle structure may be varied; means cooperative with the pivot member to provide a stop for holding the journal and front axle selectively in either front or rear position while permitting pivoting of the journal and axle about said pivot member; steerable wheels spaced laterally apart and carried respectively at opposite outer ends of the front axle, and including steering arms; a transverse tie rod interconnecting the steering arms and passing through said arch above the front axle; a steering member extending downwardly through the upper portion of the arch and above the tie rod; and a transverse drag link connected at one end to the steering member and at its other end to one of said steering arms, said drag link being disposed above the tie rod so that the tie rod and axle may pass under said drag link as the front axle is shifted selectively between front and rear positions.

2. In a tractor having a longitudinal body carried at its rear end on a transverse rear axle structure: a front end construction, comprising a body part at the front end of the tractor body including longitudinally spaced-apart supporting elements; a longitudinal pivot member carried at its opposite ends in the supporting elements; a transverse front axle having intermediate its ends a journal pivotable about the longitudinal axis of the pivot member and shiftable lengthwise of said pivot member between front and rear positions so that the longitudinal distance between the front axle and the rear axle structure may be varied; means cooperative with the pivot member and the journal for fixing the journal and front axle selectively in either said front or rear position and permitting pivoting movement in either position; laterally spaced steerable wheels respectively at the ends of the front axle and steering linkage therefor including steering arms and a transverse tie rod; a steering shaft centrally located in said body part as respects the lateral spacing of the front wheels and having a control arm thereon extending to a position intermediate the front and rear positions of the front axle and above said front axle; and a transverse drag link pivotally connected at opposite ends respectively to the projected end of said control arm and one of said steering arms, said connections of the drag link being such that the connection thereof to said one steering arm is, in either the front or rear position of the front axle, on an arc having as its center the connection of the drag link to said projected end of the control arm.

3. In a tractor having a longitudinal body carried at its rear end on a transverse rear axle structure: a front end construction, comprising a body part at the front end of the tractor body including longitudinally spaced-apart supporting elements; a longitudinal mounting member carried at its opposite ends in the supporting elements; a transverse front axle having intermediate its ends a bearing carried by said mounting member and shiftable lengthwise of said member between front and rear positions so that the longitudinal distance between the front axle and the rear axle structure may be varied; means cooperative with the mounting member and the journal for fixing the journal and front axle selectively in either said front or rear position; laterally spaced steerable wheels respectively at the ends of the front axle and steering linkage therefor including steering arms and a transverse tie rod; a steering shaft centrally located in said body part as respects the lateral spacing of the front wheels and having a control arm thereon extending to a position intermediate the front and rear positions of the front axle and above said front axle; and a transverse drag link pivotally connected at opposite ends respectively to the projected end of said control arm and one of said steering arms, said connections of the drag link being such that the connection thereof to said one steering arm is, in either the front or rear position of the front axle, on an arc having as its center the connection of the drag link to said projected end of the control arm.

4. In a tractor having a longitudinal body carried at its rear end on a transverse axle structure: a front end construction, comprising a body part at the front end of the tractor body including longitudinally spaced-apart supporting elements; a longitudinal mounting member carried at its opposite ends in the supporting elements; a transverse front axle having intermediate its ends a bearing carried by said mounting member and shiftable lengthwise of said member between front and rear positions so that the longitudinal distance between the front axle and the rear axle structure may be varied; and collar means surrounding the mounting member and cooperative with said mounting member and the journal for fixing the journal and front axle selectively in either said front or rear position.

5. In a tractor having a longitudinal body carried at its rear end on a transverse rear axle structure: a front end construction, comprising a body part at the front end of the tractor body including longitudinally spaced-apart supporting elements; a longitudinal pivot member carried at its opposite ends in the supporting elements; a transverse front axle having intermediate its ends a journal pivotable about the longitudinal axis of the pivot member and shiftable lengthwise of said pivot member between front and rear positions so that the longitudinal distance between the front axle and the rear axle structure may be varied; and means releasably cooperative with the pivot member and providing an abutment thereon for the journal for fixing the journal and front axle selectively in either said front or rear position and permitting pivoting movement in either position.

6. In a tractor having a longitudinal body carried at its rear end on a transverse rear axle structure: a front end construction, comprising a body part at the front end of the tractor body including longitudinally spaced-apart supporting elements and an upper portion above and interconnecting said elements so that said body part is in the form of an arch as viewed from either side of the tractor; a longitudinal pivot member within said arch and carried at its front and rear ends respectively by the supporting elements and spaced below said upper portion; a transverse front axle within said arch and having a journal pivotable on and shiftable lengthwise of the pivot member between said supporting elements to occupy either a front or a rear position so that the longitudinal distance between the front axle and the rear axle structure may be varied; and a removable and separable collar means cooperative with the pivot member to provide a stop for holding the journal and front axle selectively in either front or rear position while permitting pivoting of the journal and axle about said pivot member.

7. In a tractor having a longitudinal body carried at its rear end on a transverse rear axle structure: a front end construction, comprising a body part at the front end of the tractor body including longitudinally spaced-apart supporting elements and an upper portion above and interconnecting said elements so that said body part is in the form of an arch as viewed from either side of the tractor; a longitudinal pivot member within said arch and carried at its front and rear ends respectively by the supporting elements and spaced below said upper portion; a transverse front axle within said arch and having a journal pivotable on and shiftable lengthwise of the pivot member between said supporting elements to occupy either a front or a rear position so that the longitudinal distance between the front axle and the rear axle structure may be varied; means cooperative with the pivot member to provide a stop for holding the journal and front axle selectively in either front or rear position while permitting pivoting of the journal and axle about said pivot member; steerable wheels spaced laterally apart and carried respectively at opposite outer ends of the front axle, and including steering arms; and a transverse drag link connected at one end to the steering member and at its other end to one of said steering arms, said drag link being disposed above the front axle so that the front axle may pass under said drag link as the front axle is shifted selectively between front and rear positions.

THEOPHILUS BROWN.

REFERENCES CITED

The following references are of record in the file of this patent:

UNITED STATES PATENTS

| Number | Name | Date |
|---|---|---|
| 801,521 | Haas | Oct. 10, 1905 |
| 2,300,387 | Lindsay | Oct. 27, 1942 |
| 2,511,692 | Brown | June 13, 1950 |

FOREIGN PATENTS

| Number | Country | Date |
|---|---|---|
| 325,536 | Great Britain | Feb. 20, 1930 |
| 541,220 | Great Britain | Nov. 18, 1941 |